United States Patent

Miura et al.

Patent Number: 5,537,233
Date of Patent: Jul. 16, 1996

[54] DIRECT-VISION/PROJECTION TYPE LIQUID-CRYSTAL DISPLAY HAVING LIGHT SOURCE AT THE EDGE OF A GAP BETWEEN TWO LIQUID CRYSTAL PANELS

[75] Inventors: Norio Miura, Ohta; Hisao Uehara, Ohgaki; Atsuyoshi Tanioka; Kazuhiko Moriwaki, both of Gifu; Makoto Shimizu, Ohgaki; Masahiro Okuyama, Inazawa, all of Japan

[73] Assignee: Sanyo Electric Co., Ltd., Osaka, Japan

[21] Appl. No.: 340,234

[22] Filed: Nov. 16, 1994

[30] Foreign Application Priority Data

Nov. 25, 1993 [JP] Japan .................... 5-295729

[51] Int. Cl.⁶ .................... G02F 1/1335; G02F 1/1347
[52] U.S. Cl. .................... 359/48; 359/53; 362/27; 362/30
[58] Field of Search .................... 359/53, 48, 49, 359/50, 51; 345/102; 362/26, 27, 29, 30, 31

[56] References Cited

U.S. PATENT DOCUMENTS

| | | | |
|---|---|---|---|
| 4,714,983 | 12/1987 | Lang | 359/48 |
| 4,772,885 | 9/1988 | Uchara | 345/102 |
| 5,099,343 | 3/1992 | Margerum | 362/27 |
| 5,208,687 | 5/1993 | Yoshida | 359/86 |
| 5,247,374 | 9/1993 | Tereda | 359/86 |
| 5,317,431 | 5/1994 | Yoshida | 359/53 |
| 5,325,218 | 6/1994 | Willett | 359/53 |
| 5,341,231 | 8/1994 | Yamamoto | 362/31 |

FOREIGN PATENT DOCUMENTS

| | | | |
|---|---|---|---|
| 60-123823 | 7/1985 | Japan | 359/49 |
| 4-85519 | 3/1992 | Japan | 359/50 |
| WO92/14183 | 8/1992 | WIPO | 359/53 |

Primary Examiner—Anita Pellman Gross
Assistant Examiner—Tiep H. Nguyen
Attorney, Agent, or Firm—Loeb & Loeb

[57] ABSTRACT

In a display housing, first and Second liquid-crystal panels are disposed in parallel with each other, and a fluorescent lamp is positioned beside both ends of a gap between these panels. Thus, when used for a transmission type display, e.g. an OHP, the first liquid-crystal panel for light shutter is set in a transmission condition to transmit light from a light source for the OHP or the like and to irradiate the second liquid-crystal panel for displaying an image, thereby projecting the image in a magnified size onto a screen or the like. When used for a direct-vision type display, e.g. a monitor for a personal computer or the like, the first liquid-crystal panel is set in a shading condition to effect diffuse reflection of light from the fluorescent lamp by the first liquid-crystal panel and to irradiate the second liquid-crystal panel, thereby providing a direct-vision image.

5 Claims, 3 Drawing Sheets

DIRECT-VISION/PROJECTION TYPE LIQUID-CRYSTAL DISPLAY HAVING LIGHT SOURCE AT THE EDGE OF A GAP BETWEEN TWO LIQUID CRYSTAL PANELS

BACKGROUND OF THE INVENTION

1. Field of the Invention

This invention relates to a liquid-crystal display which can be used as direct-vision and projection type liquid-crystal displays.

2. Description of the Prior Art

Liquid-crystal displays have advantages, such as that they are small and thin and consume low power, and are used as displays for OA equipment and AV equipment.

The liquid-crystal display comprises a liquid-crystal panel which has a several-micrometer thick liquid-crystal layer filled between two transparent substrates which each have transparent electrodes, a driver circuit which supplies a signal voltage to the electrodes, and a light source which emits light to the liquid-crystal panel. An external input signal such as a video signal or an image signal from a computer is interfaced by the driver circuit and distributed to each electrode to apply voltage to the liquid crystal between the electrodes. Since the liquid crystal molecules have anisotropy in dielectric constant and refractive index, the application of voltage transforms original orientation state to the other state with different transmittance. For TVs and personal computer terminals, the monitors require picture elements in the range of from tens of thousands to several millions, so that the electrodes are minutely processed to arrange several hundred-micrometer picture elements in the form of a matrix and to apply different voltages to each picture element. Thus, the light and shade of each picture element are displayed to generate characters and images.

In addition to the application as a direct-vision type liquid-crystal display whose display screen can be seen by directly observing the liquid-crystal panel, the liquid-crystal display is also used as a projection type liquid-crystal display which is built into an optical system comprising a light source, a mirror and lenses as a projector. In the projection type liquid-crystal display, light emitted from the light source is given prescribed light and shade by the liquid-crystal panel and projected onto a screen to provide a large display. In particular, in widely used OHPs (overhead projectors), the use of the liquid-crystal panel instead of films eliminates problems such as the films needing to be changed by a presenter, and the images can be freely changed by a controller such as a keyboard.

The liquid-crystal display for OHPs is a projection type and does not have a light source. It is placed on the OHP's stage and modulates the light emitted from the light source of the OHP to throw a magnified image onto the screen. Therefore, this liquid-crystal display is dedicated for use with OHPs, and another display of a direct-vision type is required for the monitor of a personal computer when creating data. Although the OHP is not used so frequently, compared with the monitor, the liquid-crystal display for the OHP is required for presentation, so that users need separate displays dedicated for the monitor and the OHP, incurring high costs.

SUMMARY OF THE INVENTION

This invention has been completed to solve the above problems, and aims to provide a liquid-crystal display which can be used as direct-vision and projection type liquid-crystal displays.

To accomplish the above object, in a liquid-crystal display which applies a prescribed voltage to a liquid crystal to adjust the quantity of transmitted light in order to cause a desired display, this invention provides a first liquid-crystal panel which is configured by holding a liquid-crystal layer or a layer containing liquid crystal between a pair of substrates and driven as an optical shutter; a second liquid-crystal panel which is configured by holding a liquid-crystal layer or a layer containing liquid crystal between the another pair of substrates, disposed at a prescribed space in parallel with the first liquid-crystal panel and driven as an image display; and a lighting means which is disposed at both ends of a gap between the first and second liquid-crystal panels and emits light to the gap between the first and second liquid-crystal panels.

And, in the above configuration, when the liquid-crystal display of the invention is used for the projection type, e.g. OHPs, the first liquid-crystal panel which is disposed on the OHP's light source side is wholly or partly set in a transmission condition (with high light transmittance) to transmit incident light, and the second liquid-crystal panel which is disposed on the screen side is used as a light modulating means for displaying images, thereby projecting a magnified image wholly or partly onto the screen. When the liquid-crystal display of the invention is used for the direct-vision type, e.g. a personal computer monitor, the first liquid-crystal panel is set in a shading condition (with low light transmission) and is used as a reflective diffusion plate, and the second-liquid panel is used as a light modulating means for displaying images. Thus, the second liquid-crystal panel is observed as a direct-vision type display.

And, making the first and second liquid-crystal panels into the same structure is quite advantageous in view of costs.

Further, at least the first liquid-crystal panel which serves as the light shutter is made to have a structure that a composite film containing liquid crystal and a polymer is held between the pair of substrates. When the first liquid-crystal panel has its light transmittance lowered to use the liquid-crystal display of the invention as the direct-vision type, the first liquid-crystal panel quite effectively scatters light from the lighting means disposed by the side of the gap between the first and second liquid-crystal panels. Thus, the second liquid-crystal panel can display a bright image without nonuniformity. When the liquid-crystal display of the invention is used as the projection type, the light transmittance of the first liquid-crystal panel is controlled to be high but, since this type of liquid-crystal panel does not need a polarizing plate, a loss of light from the light source by the polarizing plate is small, and bright image can be projected onto a screen or the like. Besides, since no light is absorbed by the polarizing plate, a heating value of the panel due to the light from the light source is small, and degradation of the display quantity of liquid crystal due to heat can be reduced.

DESCRIPTION OF THE PREFERRED EMBODIMENT (Example 1)

Figure 1:
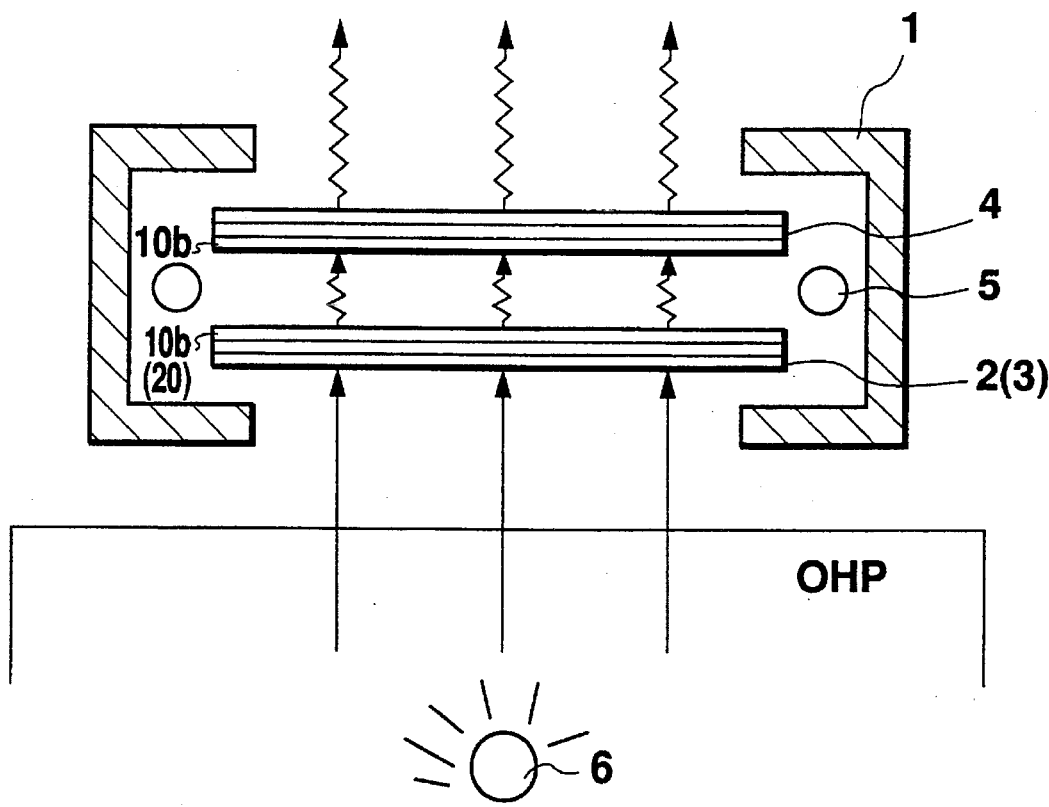
FIG. 1 is a sectional view showing the liquid-crystal display of the invention used for an OHP.
Figure 2:
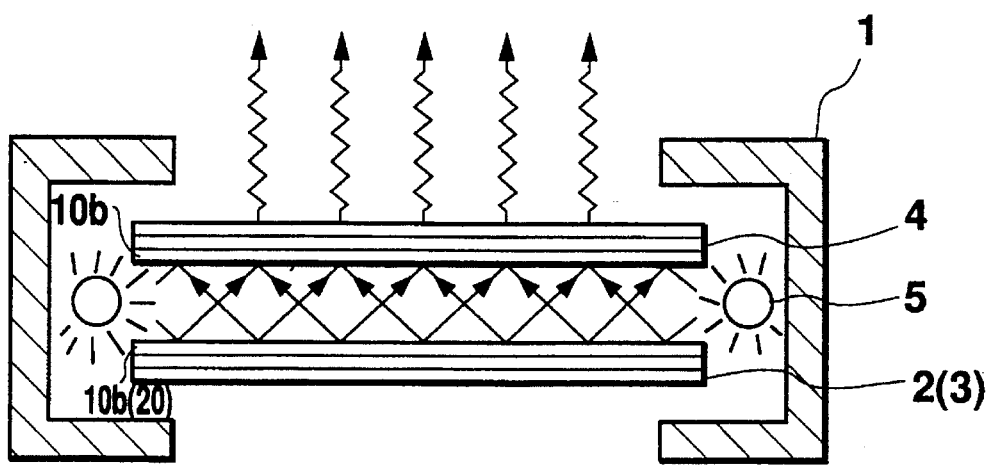
FIG. 2 is a sectional view showing the liquid-crystal display of the invention used for a monitor.

Example 1 of the invention will be described with reference to FIG. 1 to FIG. 3. FIG. 1 shows that the liquid-crystal display of the invention is used for an OHP. FIG. 2 is a sectional view showing the arrangement in a display housing 1 of the liquid-crystal display of the invention. Liquid-crystal panels 2, 4 formed by filling liquid crystal between two electrode substrates are arranged in parallel with each other, and a light source, e.g. a fluorescent lamp 5, is disposed beside both ends of a gap between these panels 2, 4. The liquid-crystal panel 2 is used as light shutter and the liquid-crystal panel 4 as light value. They are connected to a computer-controlled video driver with cables, and independently driven.

Figure 3:
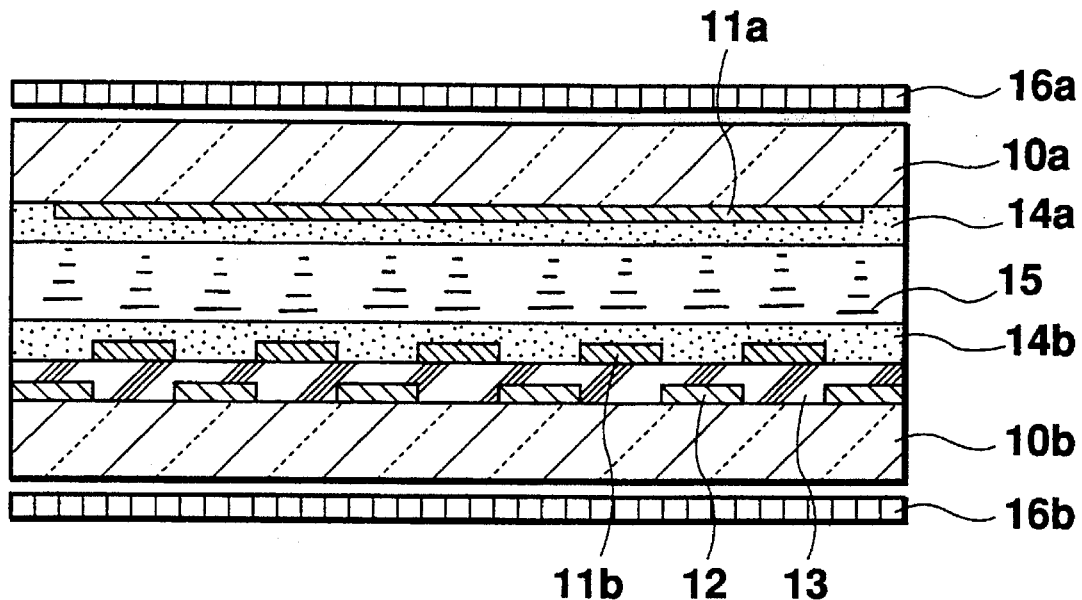
FIG. 3 is a sectional view of the liquid-crystal panel according to Examples 1 and 2 of the invention.

The liquid-crystal panels 2, 4 used are of a TN (twisted nematic) mode, and their structure is shown in FIG. 3. On the liquid-crystal layer side of transparent substrates 10a, 10b such as glass, transparent electrodes 11a, 11b made of ITO (indium tin oxide) are formed to mutually intersect at right angles. Each point of intersection of the two electrodes 11a, 11b forms display picture elements, which are arranged in matrix on the panel. On the transparent substrate 10b side, a shading film 12 formed using Al, Cr or the like is disposed on an area other than the display picture elements on the substrate, and the electrode 11b is disposed on an insulating film 13 which covers the shading film 12. Orientation films 14a, 14b of polyimide are disposed to fully cover the electrodes 11a, 11b, and these orientation films 14a, 14b are rubbed in the directions to mutually intersect at right angles to undergo orientation treatment. This orientation treatment makes the major axis directions of liquid crystal molecules 15 in close proximity to the surface of respective substrates 10a, 10b the same as the rubbing direction, so that each liquid crystal molecule 15 is twistedly arranged at 90 degrees between both of the substrates 10a, 10b. On the outside of these substrates 10a, 10b, polarizing plates 16a, 16b which have a polarizing axis coinciding with respective orientation (rubbing) directions are arranged in cross-nicol. The panels 2, 4 having the above structure are disposed as shown in FIG. 1 and FIG. 2 with the substrate 10b directed to the side of the fluorescent lamps 5, and the polarizing axis directions of the polarizing plate 16b on the substrate 10b side of each panel 2, 4 are coincident.

FIG. 1 shows an example using the liquid-crystal display of the invention for an OHP. The panel 2 is controlled to be set in a maximum transmission condition by a computer. Light from an OHP light source 6 is changed into linearly polarized light and rotated by 90 degrees in the panel 2 to be transmitted. Further, the transmitted light enters the panel 4. The panel 4 has image data entered and driven by the computer, the transmitted light is given distribution of light intensity by this panel 4, and an image according to the given distribution of light intensity is projected in a magnified size onto a screen. Also, the panel 2 can partially transmit or shade the light to provide a partial display or a partial shutter.

FIG. 2 shows an example using the liquid-crystal display of the invention for a monitor. The panel 2 is controlled to be set in a shading condition by the computer, and the fluorescent lamps 5 are turned on. Since the substrates 10b on which the shading film 12 is formed are placed to face the side on which the fluorescent lamps 5 are positioned, light emitted from the fluorescent lamps 5 is reflected on the shading films 12 of the panels 2, 4 to undergo diffused reflection between the panels 2, 4, and partially enters the panel 4. In the same way as the OHP, the panel 4 is driven by the computer to give light and shade to the incident light to provide a direct-vision display.

(Example 2)

Example 2 of the invention will be described with reference to FIG. 1, FIG. 2 and FIGS. 4 to 6. The display housing 1 and the arrangement therein are the same as in Example 1 shown in FIG. 1 and FIG. 2. Liquid-crystal panels 3, 4 formed by filling liquid crystal between two electrode substrates are arranged in parallel with each other, and a light source, e.g. a fluorescent lamp 5 is disposed beside both ends of the gap between these panels 3, 4. The liquid-crystal panels 3, 4 are used as light shutter and light value, respectively. The panel 3 is a polymer-dispersed liquid-crystal panel and driven by external switching or under computer control. The panel 4 is a matrix liquid-crystal panel and is driven under computer control.

Figure 4:
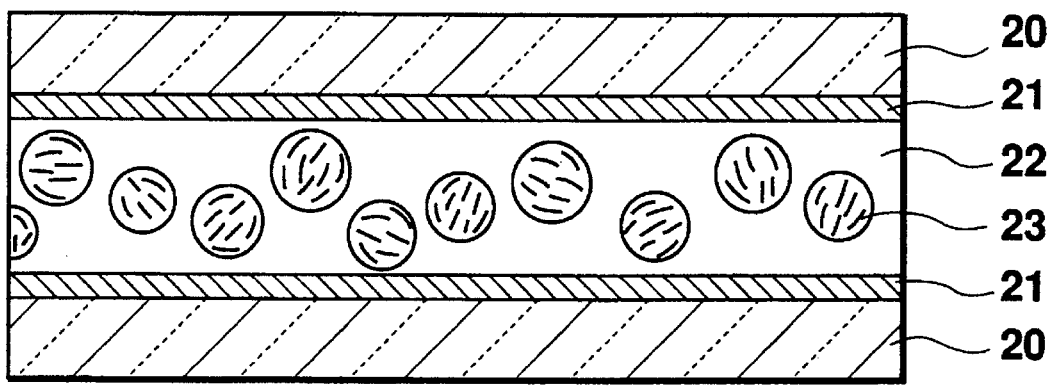
FIG. 4 is a sectional view of a polymer-dispersed liquid-crystal panel.

The polymer-dispersed liquid-crystal (PDLC) panel 3 is an optical shutter for controlling the transmission/scattering of light with a composite film containing liquid crystal and a polymer held between two transparent conductive films. Its basic structure is shown in FIG. 4. A liquid crystal-polymer composite film having 50 wt % or less of liquid crystal content is held between two plastic films 20 which are coated with a transparent conductive layer 21 for applying voltage. Liquid crystal molecules 23 with no voltage applied are phase-separated into capsule-like liquid-crystal domains within a polymer matrix 22. Since liquid crystal having positive anisotropy of dielectric constant has each of the liquid crystal molecule 23 oriented so as to be parallel with the walls of the polymer matrix 22, the orientation vector of the liquid crystal molecules 23 is nonuniform and distorted spatially with respect to all of the walls. Under this condition, therefore, the polymer and the liquid crystal have different refractive index to scatter the light, and the panel 3 is clouded so as to become a translucent white color. When voltage is applied to the liquid crystal-polymer composite film, the liquid crystal molecules 23 are homeotropic-oriented along the electric field direction regardless of the walls of the polymer matrix, so that by setting in advance to make the refractive indexes of the liquid crystal and the polymer coincident under the above condition, the panel 3 transmits the light and becomes transparent.

Figure 5:
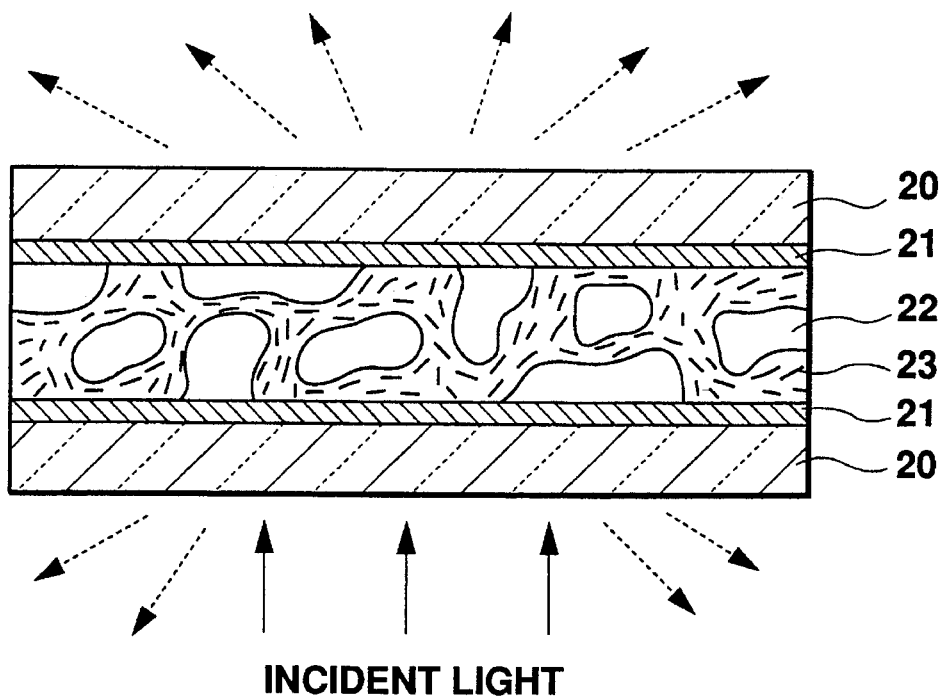
FIG. 5 is a sectional view showing an optical condition without voltage applied to the shutter liquid-crystal panel according to Example 2 of the invention.
Figure 6:
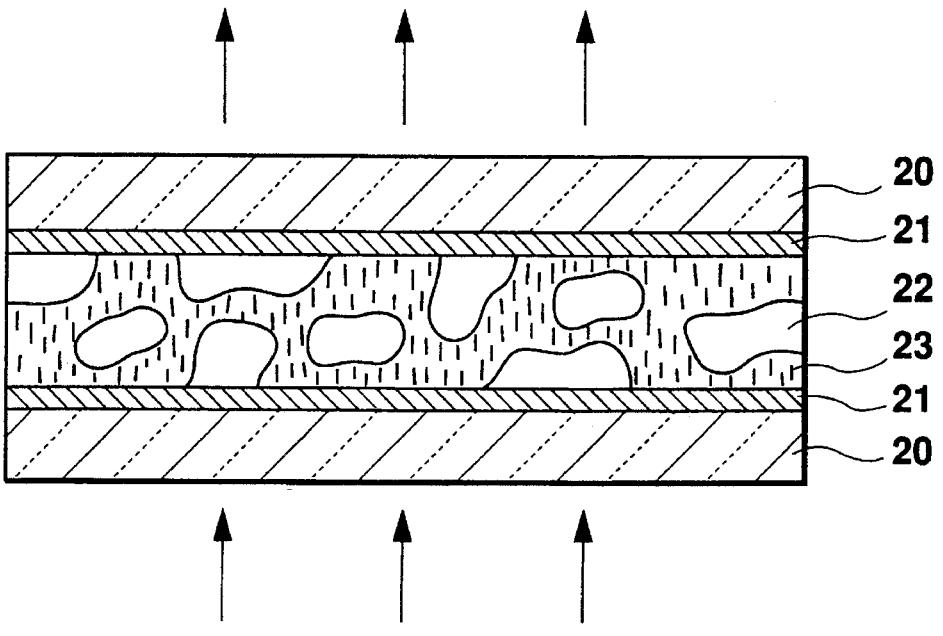
FIG. 6 is a sectional view showing an optical condition with voltage applied to the shutter liquid-crystal panel according to Example 2 of the invention.

In this Example, the liquid crystal content is adjusted to 50 to 70 wt % in the liquid crystal-polymer composite film, so that the liquid-crystal capsules are mutually connected to form a continuous layer as shown in FIG. 5 and FIG. 6. In this case, the total area of the interface between the liquid crystal and the polymer and the spatial distortion of the liquid-crystal domains become maximum, maximizing the light scattering power when no voltage is applied. This scattered light becomes a light source when this device is used as a monitor. Specifically, the PDLC panel 3 scatters the light of the fluorescent lamps 5 and functions as a diffusion plate to effectively supply light to the panel 4 of FIG. 2. Therefore, in the condition of FIG. 2, the light of the fluorescent lamp 5 disposed beside both ends of the gap between these panels 3, 4 is uniformly emitted to the panel 4 for displaying an image, and when it is used as a direct-vision display, a bright image without nonuniformity can be shown. And, since the PDLC panel 3 does not use a polarizing plate as shown in FIG. 5 and FIG. 6, when the device is used as a projection type display, the light of the OHP light source is reduced only a little by the polarizing plate, and the display quality is less degraded because the panel 3 is not caused to generate much heat by the light of the OHP light source. FIG. 5 and FIG. 6 show the optical conditions of the panel 3 without voltage applied and with voltage applied, respectively. The panel 3 has its light transmission/scattering controlled by turning ON/OFF the external switch or by the computer as in FIG. 1 and FIG. 2.

Besides, a display/shading area can be designated in advance by patterning the transparent conductive layer 21, and by using TFTs to provide an active matrix panel and driving this panel, the display/shading area can be controlled freely. This invention is characterized by disposing the shutter panel 2 or 3 in parallel with the display panel 4, enabling the use of one liquid-crystal display for an OHP and a monitor. Examples are not limited to those described above, and the modes of the panels 2 (3), 4 are not limited to TN and PDLC. As described above, to display characters and graphics, using the same structure for the panels 2 (3), 4 leads to the reduction of production costs. And, using as the panel 4 an active matrix liquid-crystal panel, or a method which arranges a switching element such as a thin film transistor on each picture element and selects a data signal line-sequentially to hold in a capacitor 11quid crystal between electrodes, the OHP can project a high-definition image or a motion picture in a magnified size.

It is obvious from the above description that a direct-vision/projection type liquid-crystal display is obtained by this invention. Thus, since a single display can be used for an OHP and a monitor, it is usually used as the monitor to create data, and can be set as the OHP for presentation as required, improving cost efficiency.

What is claimed is:

1. A liquid-crystal display for showing a desired image by applying voltage to a liquid crystal to adjust the quantity of transmitted light, characterized by:

a first liquid-crystal panel which is configured by holding a liquid-crystal layer or a layer containing liquid crystal between a pair of substrates and driven as light shutter, a second liquid-crystal panel which is configured by holding a liquid-crystal layer or a layer containing liquid crystal between another pair of substrates, disposed at a prescribed space in parallel with said first liquid-crystal panel and driven to display an image, and a lighting means which is disposed at ends of a gap between said first and second liquid-crystal panels and emits light between said first and second liquid-crystal panels.

2. A liquid-crystal display according to claim 1, wherein said liquid-crystal display is used as a projection type by increasing the light transmittance of said first liquid-crystal panel, or said liquid-crystal display is used as a direct-vision type by lowering the light transmittance of said first liquid-crystal panel and operating said lighting means.

3. A liquid-crystal display according to claim 2, wherein the light transmittance of said first liquid-crystal panel can be controlled for each area, and said area is controlled to control a display area of the display screen of said second liquid-crystal panel.

4. A liquid-crystal display according to claim 1, wherein said first and second liquid-crystal panels have the same structure.

5. A liquid-crystal display according to claim 1, wherein at least said first liquid-crystal panel is structured by holding a composite film containing liquid crystal and a polymer between said pair of substrates.

\* \* \* \* \*